United States Patent
Mimberg

(10) Patent No.: US 7,366,929 B1
(45) Date of Patent: Apr. 29, 2008

(54) COMBINED SERIAL AND PARALLEL PORT FOR HIGH SPEED CONTROLS

(75) Inventor: Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 442 days.

(21) Appl. No.: 11/189,224

(22) Filed: Jul. 25, 2005

(51) Int. Cl.
*G06F 1/26* (2006.01)

(52) U.S. Cl. ...................... 713/310; 713/300

(58) Field of Classification Search ........ 713/300–320, 713/330, 340; 327/106
See application file for complete search history.

(56) References Cited

U.S. PATENT DOCUMENTS

| | | | | |
|---|---|---|---|---|
| 6,137,188 A | * | 10/2000 | Mitchell et al. | 307/29 |
| 6,697,952 B1 | * | 2/2004 | King | 713/300 |
| 6,772,356 B1 | * | 8/2004 | Qureshi et al. | 713/321 |
| 2004/0128565 A1 | * | 7/2004 | Horigan | 713/300 |
| 2006/0047986 A1 | * | 3/2006 | Kurts et al. | 713/320 |

* cited by examiner

*Primary Examiner*—Dennis M. Butler
(74) *Attorney, Agent, or Firm*—Patterson & Sheridan, LLP

(57) ABSTRACT

Methods and apparatus for selecting one of a plurality of N-bit digital values stored in a table, via a parallel interface having a bus width less than N is provided. The plurality of N-bit digital values stored in the table may be loaded via a serial interface.

25 Claims, 4 Drawing Sheets

COMBINED SERIAL AND PARALLEL PORT FOR HIGH SPEED CONTROLS

BACKGROUND OF THE INVENTION

1. Field of the Invention

This invention relates generally to computer systems and more specifically to an apparatus and method for high speed selection of one of a limited subset of a digital values.

2. Description of the Related Art

In a typical computer system, one or more voltage regulators provide supply voltages to various system components. For example, a first voltage regulator on a motherboard may provide a supply voltage to a central processing unit (CPU) while a second voltage regulator on a graphics card may provide a supply voltage to a graphics processing unit (GPU).

Many voltage regulators designed for CPUs are programmable, allowing for adjustment of the supply voltage output by the regulator. For example, FIG. 1 illustrates an exemplary voltage regulator 100 with a supply voltage adjustable via an N-bit code (referred to as a voltage ID or simply VID). A CPU 110 may dynamically adjust the supply voltage provided by the voltage regulator 100 via an N-bit wide parallel interface 102.

The supply voltage may be dynamically adjusted (e.g., to provide boosted voltage at startup/boot-time, compensate for temperature, and/or maintain a desired operating frequency) by changing the N-bit VID supplied to the voltage regulator 100. Typically, the supply voltage may be adjusted in incremental steps over a defined operating range (e.g., $V_{STEP}=V_{RANGE}/2^N$). For example, with an operating range of approximately 0.8V to 1.6V, a 6-bit VID codes may be used to select supply voltages in approximately 12.5 mV steps. Thus, the CPU 110 may make fine adjustments to the supply voltage relatively quickly via the parallel interface 102.

Programmable voltage regulators may also be utilized in graphics cards, allowing GPUs to dynamically adjust their supply voltages. However, GPUs typically require a limited number of different supply voltages and often have only a limited number of general purpose input/output (GPIO) pins available. Therefore, as illustrated in FIG. 2, to allow a GPU 120 to adjust the voltage supplied by a voltage regulator 100, an external mapping circuit 122 may be provided that maps voltage select signals provided on a relatively small number of pins (less than N) to an N-bit VID code supplied on the parallel interface 102. Illustratively, two pins of the GPU 120 are utilized, which allows selection of up to four different voltages.

Unfortunately, there are a number of disadvantages to this approach. For example, the VID mapping circuit 122 adds cost and occupies space. Further, if different voltages are desired, for example, due to different application requirements or to accommodate a different processor, the VID mapping circuit 122 must be reconfigured to generate a different set of VIDs (e.g., requiring a change in bill of materials).

Accordingly, what is needed is an improved method and apparatus for adjusting the supply voltage provided by a voltage regulator.

SUMMARY OF THE INVENTION

Embodiments of the present invention generally provide methods and apparatus for selecting one of a plurality of N-bit digital values stored in a table, via a parallel interface having a bus width less than N is provided. The plurality of N-bit digital values stored in the table may be loaded via a serial interface.

One embodiment provides a method of controlling a supply voltage. The method generally includes loading a plurality of entries into a table contained in a voltage regulator via a serial interface, each entry including an digital value comprising N bits, wherein N is an integer value greater than 2, and selecting one of the entries via a parallel interface having a bus width less than N, causing the voltage regulator to generate a first supply voltage based on the digital value of the selected entry.

Another embodiment provides a voltage regulator. The voltage regulator generally includes a voltage generator circuit, a table having a plurality of N-bit digital values, wherein one of N-bit digital values is selectable via a parallel interface to cause the voltage generator circuit to generate a supply voltage based on the selected N-bit digital value, and a load control circuit for receiving the N-bit digital values via a serial interface and storing the N-bit digital values in the table.

Another embodiment provides a system generally including a central processing unit, a graphics processing unit, and a voltage regulator. The voltage regulator generally includes a) a voltage generator circuit, b) a table having a plurality of N-bit digital values, wherein one of N-bit digital values is selectable via a parallel interface to cause the voltage generator circuit to generate a supply voltage provided to the graphics processing unit based on the selected N-bit digital value; and c) a load control circuit for receiving the N-bit digital values via a serial interface and storing the N-bit digital values in the table.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide a mechanism allowing digital values of several (N) bits to be quickly selected via a parallel interface that is less than N bits wide. The N-bit digital values may be stored as entries in a table that is addressable via the parallel interface. The table may be loaded via a serial interface, allowing the particular digital values loaded to be selected based on particular application needs and adjusted, as necessary. The concepts described herein may be applied in a number of different applications where it may be desirable to quickly select N-bit digital values with less than N control signals, for example, where a limited number of I/O pins are available in a controlling device.

As an application example, one embodiment of the present invention provides a voltage regulator with a table for storing digital voltage identification values (VIDs). Components may select a particular VID stored in the table via a parallel interface and load the table with VIDs via the serial interface. As a result, components, such as CPUs and GPUs, may be able to dynamically adjust supply voltages quickly by select N-bit VIDs using fewer than N pins and without external circuitry. The ability to load new values into the table via the serial interface may allow the particular VIDs loaded to be selected based on actual device testing, alleviate inventory issues, and even extend product life by adjusting voltage values to maintain specified performance criteria (e.g., by increasing voltage to maintain operating frequency).

An Exemplary Voltage Regulator

Figure 1:
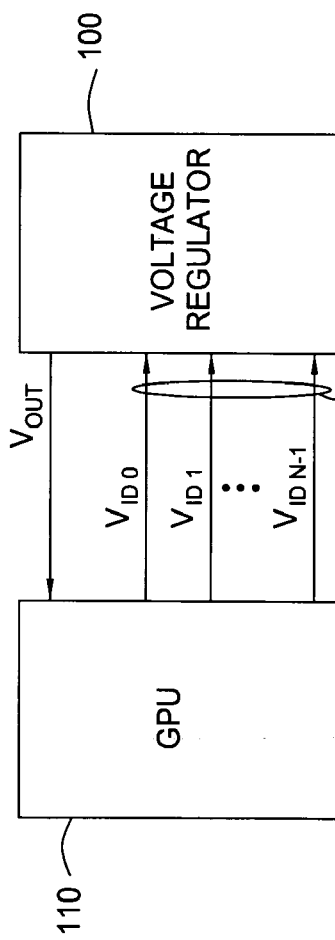
FIG. 1 illustrates an exemplary programmable voltage regulator controlled by a CPU in accordance with the prior art.
Figure 2:
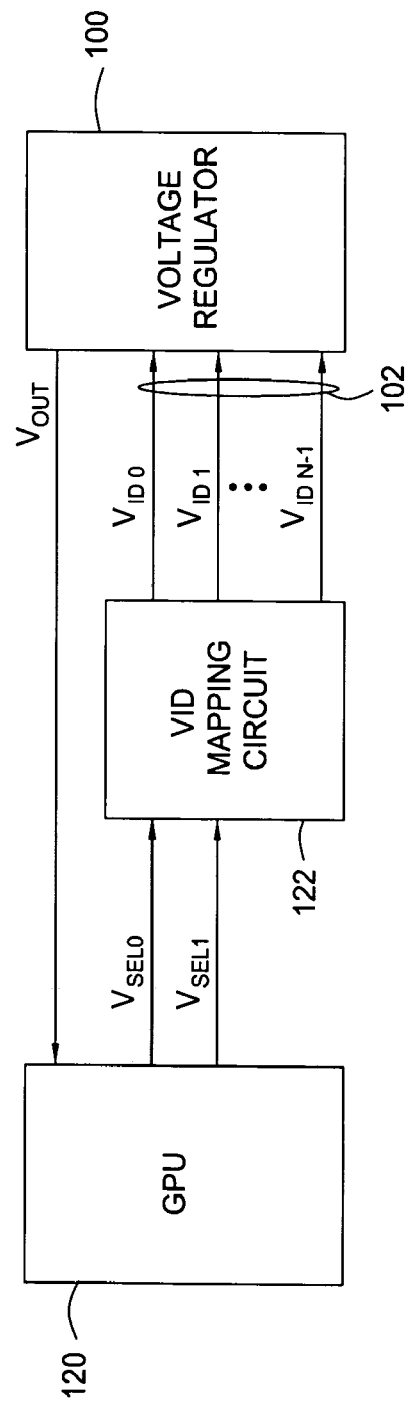
FIG. 2 illustrates an exemplary programmable voltage regulator controlled by a GPU in accordance with the prior art.
Figure 3:
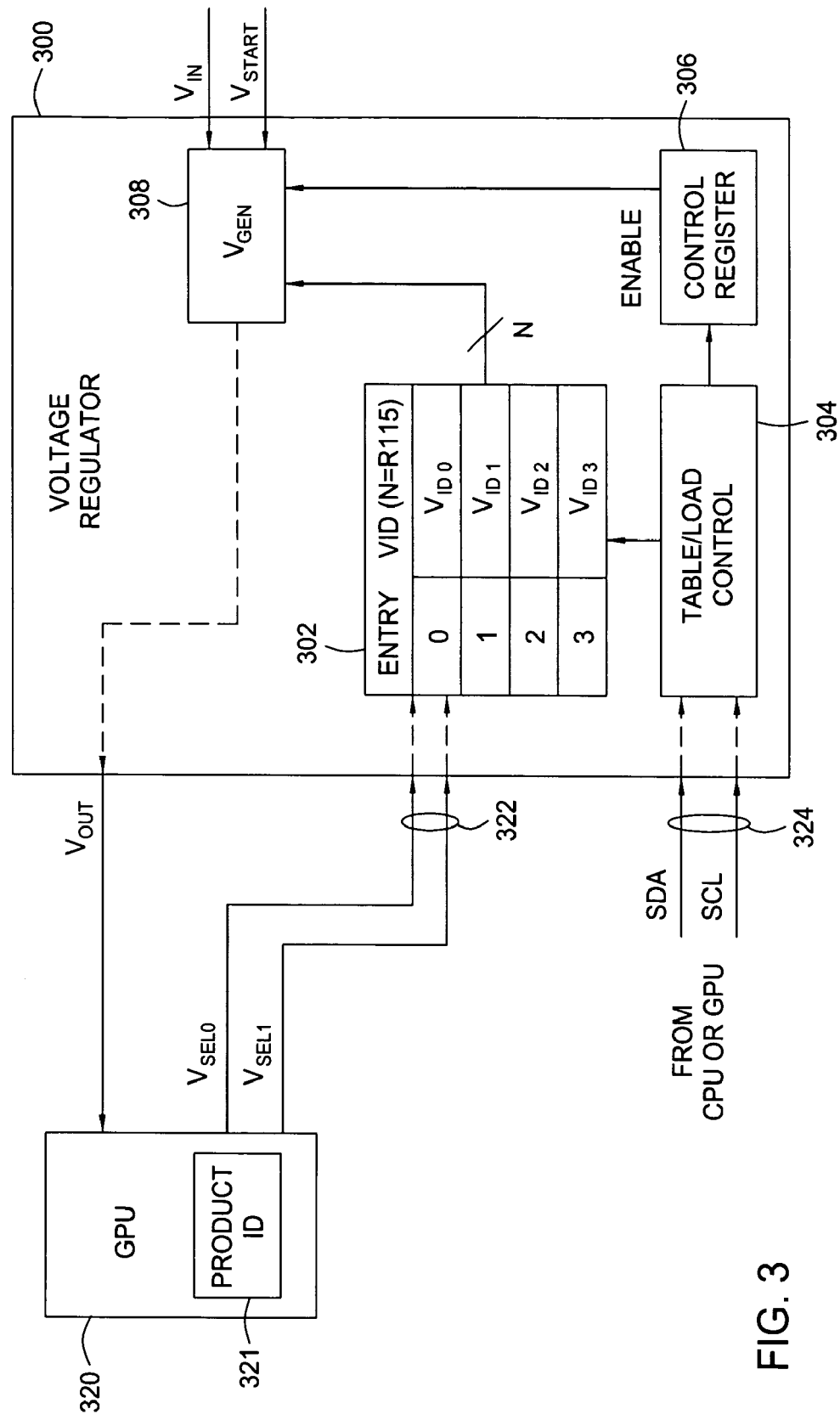
FIG. 3 illustrates an exemplary programmable voltage regulator controlled by a GPU in accordance with one embodiment of the present invention.

FIG. 3 illustrates an exemplary voltage regulator 300 that provides a supply voltage ($V_{OUT}$) to a GPU 320. The voltage regulator 300 includes a table 302 of N-bit VIDs selectable by the GPU 320 via a parallel interface 322. In other words, the GPU 320 may adjust the supply voltage by selecting a particular VID from the table 302 via the parallel interface 322. The VID selected from the table 302 may be output to a voltage generator circuit 308 that generates the supply voltage as a function of the selected VID.

This arrangement allows the GPU 320 to select an N-bit VID, although the parallel interface 322 may have substantially less than N-bits. The exact width of the parallel interface 322 and number of bits N may be determined by a particular application. The width of the parallel interface 322 determines the number of entries in the VID table 302 that may be addressed. Illustratively, the parallel interface 322 has a width of 2 and, thus, may be used to select one of four ($2^2$) entries in the VID table 302.

These entries may include VID values that result in desired supply voltages for various operating situations of the GPU 320. For example, a first entry may include a VID value that results in a relatively low supply voltage for normal operation. Other entries may include VID values with relatively higher supply voltage values for startup, or when the GPU demands higher operating frequency (e.g., when multiple execution pipelines are loaded). The GPU 320 may be configured to detect these operating situations and, in response, generate voltage selection signals on the parallel interface 322 to select the appropriate VIDs from the table 302.

The table 302 may be loaded with VID values via a serial interface 324, which may be any suitable type serial interface (e.g., I²C, SPI, or a proprietary interface). Table/load control circuitry 304 may be configured to receive VID values serially over the interface 324 and transfer those values to the table 302. As will be discussed in greater detail below, the table 302 may be loaded at various times, such as during a power-up sequence to initialize the table 302, or during a dynamic adjustment to change the VIDs stored therein.

The table 302 may comprise any suitable volatile storage elements, such as static random access memory (SRAM) or dynamic random access memory (DRAM), or non-volatile storage elements, such as flash memory or electrically erasable programmable read only memory (EEPROM). Non-volatile memory may allow table entries to be maintained across power cycles, thus preventing the need to initialize the values each time.

For some embodiments, a control register 306 may be written to via the serial interface 324 to enable/disable use of the table 302 in determining the supply voltage output by the voltage regulator 300. For example, the control register 306 may include a bit that, if cleared, causes the voltage generator 308 to generate the supply voltage based on an externally supplied reference or "start" voltage ($V_{START}$), rather than generating the supply voltage based on a VID supplied by the table 302. This enable bit may be cleared prior to writing new VID values to the table 302, to prevent unpredictable supply voltages as the table 302 is being updated. This bit may also be cleared by default on power-up, for example, to ensure an acceptable supply voltage (e.g., based on $V_{START}$) is provided by the voltage regulator 300 to the GPU 320 until use of the VID table 302 is manually enabled via the control register 306.

In some cases, the GPU 320 may be configured to write new VID values to the VID table 302, via the serial interface 324. For example, the GPU 320 may be configured to execute instructions that cause the table 302 to be loaded with VID values. For some embodiments, the particular values loaded may be determined by a product ID value 321 embedded in the GPU 320 (e.g., in laser fuses or other type non-volatile storage) that classifies the GPU 320, for example, based on manufacturing test results. For example, the product ID value 321 may indicate that a particular set of supply voltages should be used in order to achieve specified performance characteristics, such as power consumption or operating frequency.

In some cases, a component other than the GPU 320, such as a CPU, may load the table 302 with VID values. For example, the CPU may be executing basic I/O system (BIOS) code that determines what VID values to load, possibly after reading the product ID value 321 embedded in the GPU 320. In this manner, a common version of BIOS code may load different sets of VID values, depending on the product ID value 321 of the GPU 320, which may simplify manufacturing processes. For some embodiments, a supply voltage for one component may be selected by another component. In other words, the voltage regulator 300 may provide a supply voltage to one component, while another component selects a VID via the parallel interface 322.

Exemplary Voltage Control Operations

Figure 4:
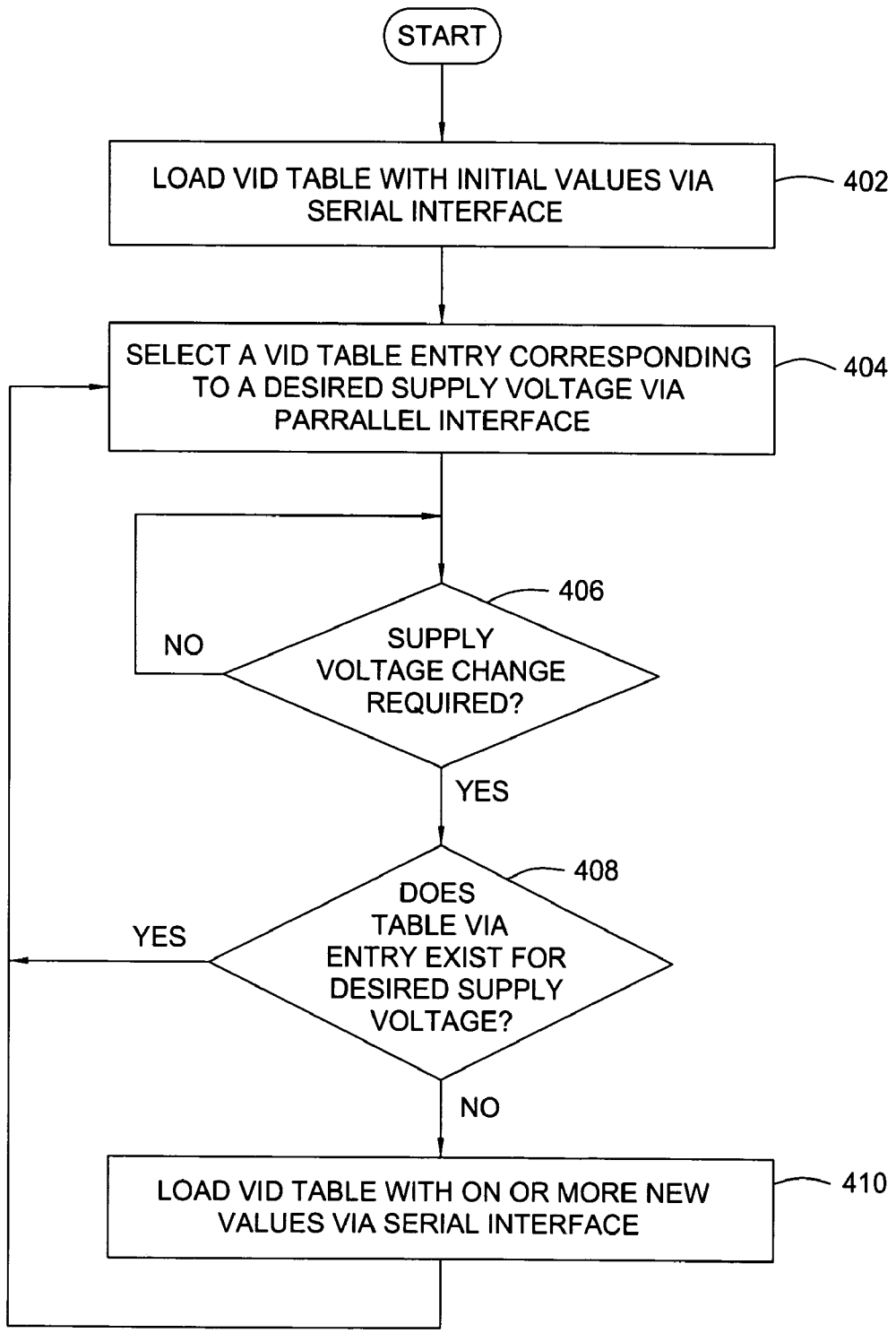
FIG. 4 is a flowchart of exemplary operations for controlling a voltage regulator in accordance with one embodiment of the present invention.

FIG. 4 is a flowchart of exemplary operations for controlling a voltage regulator in accordance with one embodiment of the present invention. For example, these operations may be performed to dynamically adjust the supply voltage provided to a CPU or GPU. The operations begin, at step 402, by loading the VID table 302 with values via the serial interface. This loading may occur during boot time (e.g., to initialize the table 302) or later to adjust supply voltage settings (e.g., in response to changing operating conditions). As previously described, the loading may be carried out by a device whose supply voltage is being provided by the voltage regulator or a different device.

At step 404, a VID table entry corresponding to a desired supply voltage is selected via the parallel interface. As previously described, in some cases, use of the VID table 302 may be disabled upon power up and/or table loading to prevent unpredictable supply voltages. In such cases, use of the VID table 302 may need to be enabled before the selected VID table entry 302 is applied.

The device may operate at the supply voltage determined by the selected VID value until a supply voltage change is required, as determined at step 406, for example, based on detection of a change in operating conditions. If an entry in the VID table corresponding to the desired change in supply voltage already exists, as determined at step 408, operations proceed to step 404, to select that entry.

On the other hand, if an entry in the VID table 302 corresponding to the desired change in supply voltage does not exist, operations proceed to step 410, to load the VID table 302 with one or more new values (including a value corresponding to the desired change in supply voltage) via the serial interface, at step 410. As previously described, use of the VID table 302 may be disabled prior to loading. In any case, after the table 302 is loaded with an entry corresponding to the desired change in supply voltage, operations may proceed to step 404, to select the entry corresponding to the desired change in supply voltage. These operations may be repeated during operation of a system to dynamically adjust supply voltage.

In some cases, the operating life of such a system may be extended by allowing operating parameters of a component, that may have otherwise fallen outside of specified operating ranges, to be maintained within these ranges by dynamically adjusting the supply voltage. These operations may also allow otherwise unattainable performance and/or power optimizations, for example, by increasing voltage (and operating frequency) when a device is heavily loaded or, conversely, decreasing voltage during idle times to conserve power.

ALTERNATIVE EMBODIMENTS

Embodiments of the present invention have been described with reference to a programmable voltage regulator for use with a GPU and/or CPU as a specific, but not limiting, example of how a combination of a parallel and serial interface may be utilized to allow for N-bit digital values to be selected with fewer than N control lines. The same concepts may be applied in a variety of other applications, for example, where a component has a limited number of I/O pins for use in selecting a digital value or where it is desirable to limit the number of control lines routed.

As another example, the concepts of serial loading and fast parallel access could be used for memory "paging." In such an application, a processing unit could address a wide address range with a page register (in the table) without the need for a wide bus to access that register. The concept could also be used to implement a generic pattern generator that could create a limited number of patterns (e.g. 256 patterns for ASCII characters) on displays that utilize thousands of LEDs. A relatively large character set could be loaded serially and then individual characters could be accessed quickly, for example, with an 8 bit bus.

Figure 5:
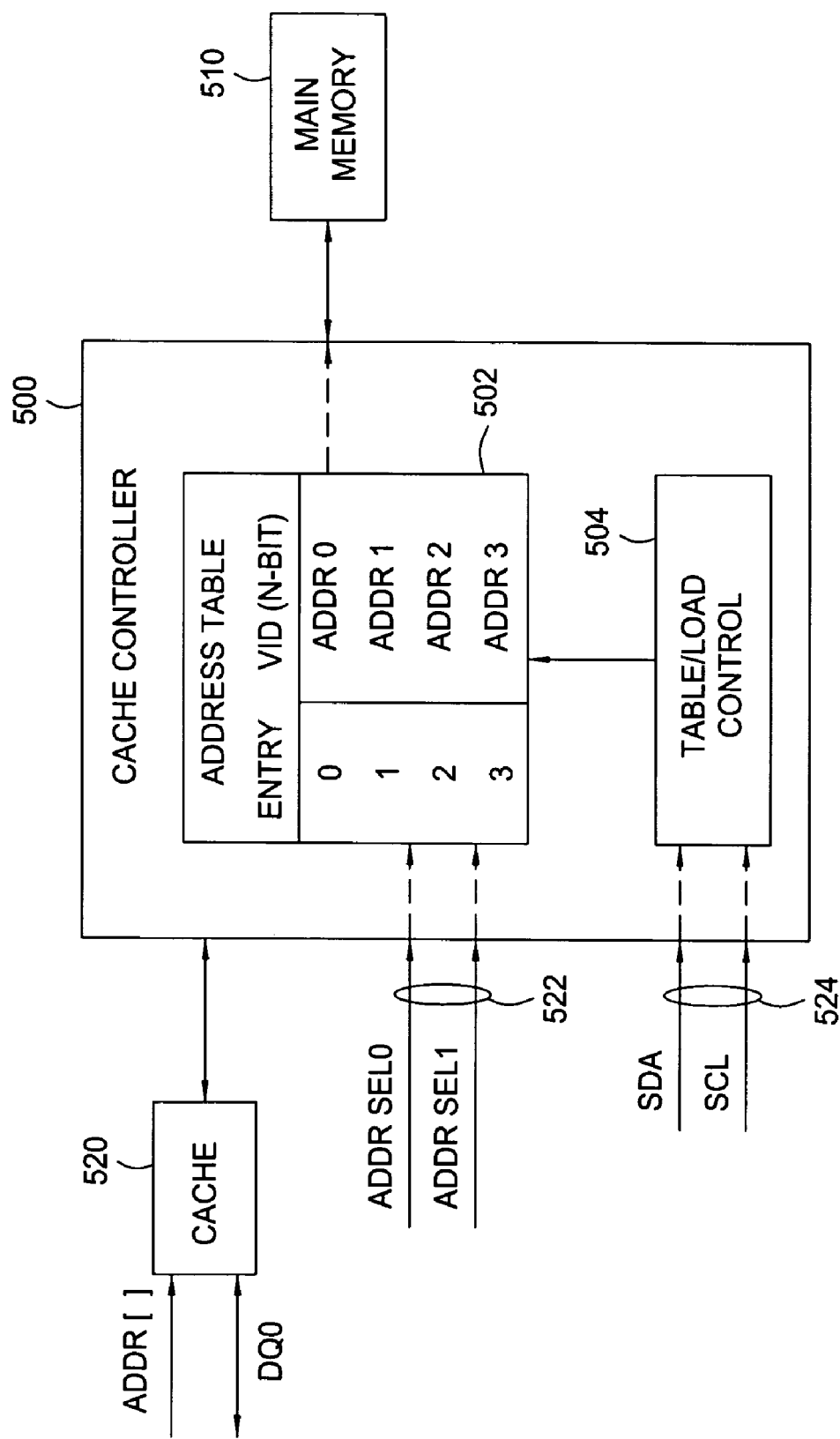
FIG. 5 illustrates an exemplary memory controller utilizing concepts of the present invention.

FIG. 5 illustrates an exemplary cache controller 500 utilizing concepts of the present invention. As illustrated, the controller 500 includes an address table 502 with entries containing N-bit addresses. For some embodiments, the cache controller 500 may be configured to fetch blocks of data, specified by the addresses in the address table 502, from main memory 510 and store the blocks of data in a high speed cache 520.

As a result, the cache controller 500 may allow a device with insufficient I/O lines to provide an entire N-bit address to benefit from caching memory stored at N-bit address locations. In other words, such a device may load N-bit addresses into the table 502 via a serial interface 524. The device may then select one of the addresses in the table 502 via parallel interface 522. In response to a new selection, the cache controller 500 may fetch a corresponding block of data from main memory 510 and store it in the cache 520.

The device may then access the data from the cache 520 utilizing a limited number of address bits (e.g., determined by the block size cached). In other words, because the full N-bit address is known, the device only needs to specify a portion (e.g., only lower address bits) of the full N-bit address to access data from the cache. This approach may be particularly useful if the device operates on data in a highly "local" manner (i.e., accessing nearby address locations). When a new block of data is required, the address table 502 may be loaded with one or more new N-bit addresses via the serial interface 524.

While the foregoing is directed to embodiments of the present invention, other and further embodiments of the invention may be devised without departing from the basic scope thereof, and the scope thereof is determined by the claims that follow.

The invention claimed is:

1. A method of controlling a supply voltage, comprising:
    loading a plurality of entries into a table contained in a voltage regulator via a serial interface, each entry including an digital value comprising N bits, wherein N is an integer value greater than 2; and
    selecting one of the entries via a parallel interface having a bus width less than N, causing the voltage regulator to generate a first supply voltage based on the digital value of the selected entry.

2. The method of claim 1, wherein loading the table comprises loading the table by a device to which the supply voltage is provided.

3. The method of claim 1, wherein selecting one of the entries comprises selecting one of the entries by a device to which the supply voltage is provided.

4. The method of claim 1, further comprising selecting a different one of the entries via the parallel interface causing the voltage regulator to generate a second supply voltage based on the digital value of the different one of the entries.

5. The method of claim 4, further comprising:
    detecting a change in operating conditions of a device to which the supply voltage is provided; and
    in response, selecting the different one of the entries via the parallel interface.

6. The method of claim 1, further comprising:
    loading the table with at least one different entry corresponding to a desired supply voltage level; and
    selecting the at least one different entry.

7. The method of claim 6, further comprising disabling use of table entries for generating the supply voltage prior to loading the table with at least one different entry.

8. A voltage regulator, comprising:
    a voltage generator circuit;
    a table having a plurality of N-bit digital values, wherein one of the N-bit digital values is selectable via a parallel interface to cause the voltage generator circuit to generate a supply voltage based on the selected N-bit digital value; and
    a load control circuit for receiving the N-bit digital values via a serial interface and storing the N-bit digital values in the table.

9. The voltage regulator of claim 8, further comprising a control register having one or more bits to disable use of the table in controlling the voltage generator circuit.

10. The voltage regulator of claim 9, wherein the voltage generator circuit is configured to generate a supply voltage based on an externally supplied voltage when use of the table in controlling the voltage generator circuit is disabled.

11. The voltage regulator of claim 8, wherein the sum of the number of lines of the parallel interface and the number of lines of the serial interface is less than N.

12. The voltage regulator of claim 8, wherein the table comprises non-volatile memory.

13. A system, comprising:
a central processing unit;
a graphics processing unit; and
a voltage regulator comprising a) a voltage generator circuit, b) a table having a plurality of N-bit digital values, wherein one of N-bit digital values is selectable via a parallel interface to cause the voltage generator circuit to generate a supply voltage provided to the graphics processing unit based on the selected N-bit digital value; and c) a load control circuit for receiving the N-bit digital values via a serial interface and storing the N-bit digital values in the table.

14. The system of claim 13, wherein the central processing unit is configured to load the table with a first plurality of N-bit digital values via the serial interface.

15. The system of claim 14, wherein the central processing unit is configured to load the table with the plurality of N-bit digital values via the serial interface while executing basic input/output operating system (BIOS) code.

16. The system of claim 13, wherein the graphics processing unit is configured to select a first entry in the table via the parallel interface causing the voltage regulator to generate a first supply voltage.

17. The system of claim 16, wherein the graphics processing unit is further to select a second entry in the table via the parallel interface causing the voltage regulator to generate a second supply voltage.

18. The system of claim 16, wherein the graphics processing unit is configured to:
detect a change in operating conditions of the graphics processing unit; and
in response, select the second entry in the table via the parallel interface.

19. The system of claim 13, wherein at least one of the central processing unit and the graphics processing unit is configured to:
write to a control register of the voltage regulator to disable use of the N-bit digital values in the table in generating the supply voltage by the voltage generator; and
load one or more digital values to the table.

20. The system of claim 19, wherein the voltage generator is configured to generate the supply voltage based on an externally supplied reference voltage when use of the N-bit digital values in the table in generating the supply voltage by the voltage generator is disabled.

21. A processing unit configured to generate a plurality of control signals on a parallel interface to select an N-bit digital value stored in a table on a voltage generator, thereby causing the voltage generator to generate a supply voltage provided to the processing unit based on the selected N-bit digital value, wherein a bus width of the parallel bus is less than N.

22. The processing unit of claim 21, further configured to load a plurality of N-bit digital values into the table via a serial interface.

23. The processing unit of claim 21, wherein the processing unit is a graphics processing unit.

24. An integrated circuit device, comprising:
a table having a plurality of N-bit digital values, wherein one of the N-bit digital values is selectable via a parallel interface having P lines; and
a load control circuit for receiving the N-bit digital values via a serial interface having S lines and storing the N-bit digital values in the table,
wherein N is greater than S+P.

25. The integrated circuit device of claim 24, wherein the table comprises non-volatile storage.

* * * * *